United States Patent
Lefebvre et al.

(10) Patent No.: US 6,924,799 B2
(45) Date of Patent: Aug. 2, 2005

(54) METHOD, NODE, AND NETWORK FOR COMPOSITING A THREE-DIMENSIONAL STEREO IMAGE FROM A NON-STEREO APPLICATION

(75) Inventors: Kevin T. Lefebvre, Ft. Collins, CO (US); Howard D. Stroyan, Ft. Collins, CO (US); Samuel C. Sands, Wellington, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 10/086,402

(22) Filed: Feb. 28, 2002

(65) Prior Publication Data

US 2003/0160780 A1 Aug. 28, 2003

(51) Int. Cl.[7] .............................................. G06T 15/00
(52) U.S. Cl. ...................... 345/419; 345/503; 345/505; 345/506; 348/43; 709/203; 709/231
(58) Field of Search ................................. 345/419, 503, 345/505, 506; 348/43; 709/203, 231

(56) References Cited

U.S. PATENT DOCUMENTS

| | | | | |
|---|---|---|---|---|
| 5,982,375 A | * | 11/1999 | Nelson et al. | 345/419 |
| 6,111,597 A | * | 8/2000 | Tabata | 348/43 |
| 6,147,695 A | * | 11/2000 | Bowen et al. | 345/503 |
| 6,446,130 B1 | * | 9/2002 | Grapes | 709/231 |
| 6,590,573 B1 | * | 7/2003 | Geshwind | 345/419 |

* cited by examiner

Primary Examiner—Kimbinh T. Nguyen (57) ABSTRACT

A method of assembling a composite image comprising generating three-dimensional data defining a non-stereo image, assigning a first screen portion to a first rendering node, assigning a second screen portion to a second rendering node, rendering, by the first rendering node, a left image portion from the three-dimensional data, rendering, by the second rendering node, a right image portion from the three-dimensional data, and sequentially assembling the left image portion and the right image portion into the composite image is provided.

23 Claims, 8 Drawing Sheets

| FRAME BUFFER SEQUENCE | 0L | 0R | 1L | 1R |
|---|---|---|---|---|
| IMAGE SEQUENCE | 1 | | 2 | |

METHOD, NODE, AND NETWORK FOR COMPOSITING A THREE-DIMENSIONAL STEREO IMAGE FROM A NON-STEREO APPLICATION

TECHNICAL FIELD OF THE INVENTION

This invention relates to a computer graphical display system and, more particularly, to a method, node, and network for compositing a three-dimensional stereo image from an image generated from a non-stereo application.

BACKGROUND OF THE INVENTION

Designers and engineers in manufacturing and industrial research and design organizations are today driven to keep pace with ever-increasing design complexities, shortened product development cycles and demands for higher quality products. To respond to this design environment, companies are aggressively driving front-end loaded design processes where a virtual prototype becomes the medium for communicating design information, decisions and progress throughout their entire research and design entities. What was once component-level designs that were integrated at manufacturing have now become complete digital prototypes—the virtual development of the Boeing 777 airliner is one of the more sophisticated and well-known virtual designs to date.

With the success of an entire product design in the balance, accurate, real-time visualization of these models is paramount to the success of the program. Designers and engineers require availability of visual designs in up-to-date form with photo-realistic image quality. The ability to work concurrently and collaboratively across an extended enterprise often having distributed locales is tantamount to a programs operability and success. Furthermore, virtual design enterprises require scalability so that the virtual design environment can grow and accommodate programs that become ever more complex over time.

Stereo image applications allow for viewing of three-dimensional images in stereo via stereo image viewing equipment. However, few graphics applications capable of generating three-dimensional stereo images exist. Passive stereo applications provide presentation of simultaneous channels, i.e., one channel being associated with the left eye of a viewer (the "left channel") and the other channel being associated with the right eye of the viewer (the "right channel"), of a video display. Typically, passive stereo is facilitated by the use of headgear which is configured to allow each eye of the viewer to view only one of the simultaneously displayed channels of video. Active stereo applications refer to the presentation of alternating channels, i.e., one channel being associated with the left eye of a viewer (the "left channel") and the other channel being associated with the right eye of the viewer (the "right channel"), of a video display. Typically, active stereo is facilitated by the use of headgear that is synchronized with a display device so that the viewer views one channel of the video display with the left eye and the other channel with the right eye. Heretofore, however, visualization systems relying on compositing applications for assembling of image portions required specialized stereo graphics applications having image partitioning capabilities in order to realize stereo imaging within the visualization system.

SUMMARY OF THE INVENTION

In accordance with an embodiment of the present invention, a method of assembling a composite image comprising generating three-dimensional data defining a non-stereo image, assigning a first screen portion to a first rendering node, assigning a second screen portion to a second rendering node, rendering, by the first rendering node, a left image portion from the three-dimensional data, rendering, by the second rendering node, a right image portion from the three-dimensional data, and assembling the left image portion and the right image portion into the composite image is provided.

In accordance with another embodiment of the present invention, a node of a network for rendering a three-dimensional image comprising a processing element, and a memory module maintaining a stereo transform application executable by the processing element, the stereo transform application operable to receive three-dimensional data defining a non-stereo image, process the three-dimensional data and provide output of at least one of a left channel image and a right channel image of a composite image comprised of the left channel image and the right channel image is provided.

In accordance with another embodiment of the present invention, a network for rendering a three-dimensional composite stereo image comprising a first and second rendering node each respectively comprising a first and second processing element and a first and second memory module maintaining a respective instance of a stereo application executable by the first and second processing element, each instance of the stereo transform application operable to receive data defining a three-dimensional non-stereo image, perform a transform on the three-dimensional non-stereo image and output at least one of a left channel image and a right channel image, and a compositor node operable to receive a respective first data stream and a second data stream from the first and second rendering nodes, the first data stream comprising one of the left channel image and the right channel image output from the instance of the stereo transform application maintained by the first rendering node, the second data stream comprising one of the left channel image and the right channel image output from the instance of the stereo transform application maintained by the second rendering node, the compositor node operable to assemble the first data stream and the second data stream into a composite three-dimensional stereo image is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 14 of the drawings, like numerals being used for like and corresponding parts of the various drawings.

Figure 1:
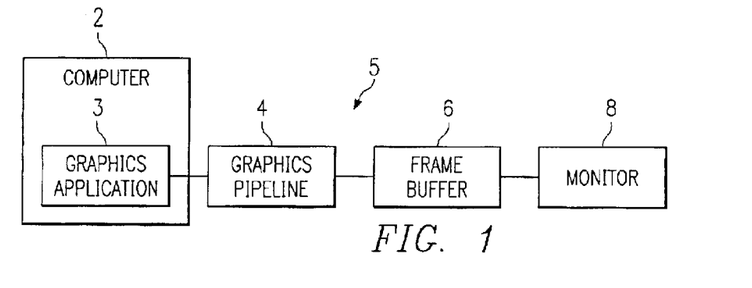
FIG. 1 is a block diagram of a conventional computer graphical display system according to the prior art.

FIG. 1 depicts a block diagram of a conventional computer graphical display system 5 according to the prior art. A graphics application 3 stored on a computer 2 defines, in data, an object to be rendered by system 5. To render the object, application 3 transmits graphical data defining the object and a viewpoint to graphics pipeline 4, which may be implemented in hardware, software, or a combination thereof. Graphics pipeline 4, through well-known techniques, processes the graphical data received from application 3 and stores the graphical data in a frame buffer 6. Frame buffer 6 stores the graphical data necessary to define the image to be displayed by a monitor 8. In this regard, frame buffer 6 includes a set of data for each pixel displayed by monitor 8. Each set of data is correlated with the coordinate values that identify one of the pixels displayed by monitor 8, and each set of data includes the color value of the identified pixel as well as any additional information needed to appropriately color or shade the identified pixel. Normally, frame buffer 6 transmits the graphical data stored therein to monitor 8 via a scanning process such that each line of pixels defining the image displayed by monitor 8 is sequentially updated.

Figure 2:
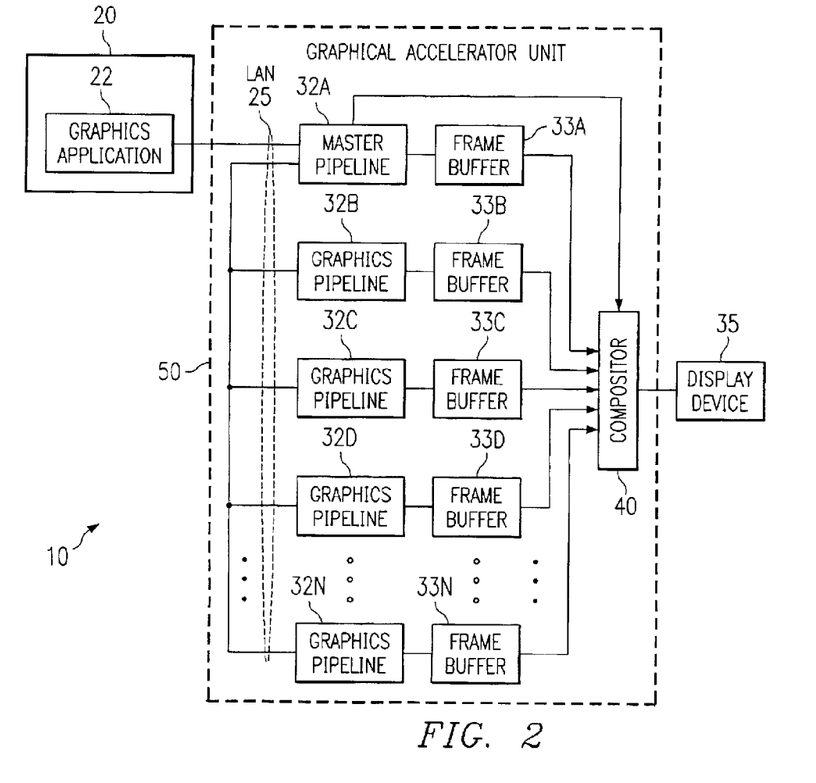
FIG. 2 is a block diagram of the exemplary scaleable visualization center of FIG. 1 including graphics pipelines in which the present invention may be implemented for advantage.

In FIG. 2, there is a block diagram of the exemplary scaleable visualization system 10 including graphics, or rendering, pipelines 32A–32N in which the present invention may be implemented for advantage. Visualization center 10 includes master system 20 interconnected, for example via a network 25 such as a gigabit local area network, with master pipeline 32A that is connected with one or more slave graphics pipelines 32B–32N that may be implemented as graphics-enabled workstations. Master system 20 may be implemented as an X server and may maintain and execute a high performance three-dimensional rendering application, such as OpenGL(R). Renderings may be distributed from one or more pipelines 32A–32N across visualization center 10 assembled by a compositor 40 and displayed at a remote display device 35 as a single image.

Master system 20 runs an application 22, such as a computer-aided design/computer-aided manufacturing (CAD/CAM) application, and may control and/or run a process, such as X server, that controls a bitmap display device and distributes 3D-renderings to multiple 3D-rendering pipelines 32A–32N. Network 25 provides connections to rendering pipelines and master system 20.

Rendering pipelines may be responsible for rendering to a portion, or sub-screen, of a full application visible frame buffer. In such a scenario, each rendering pipeline defines a screen space division that may be distributed for application rendering requests. Connections between rendering pipelines and compositor 40 may be had via a digital video connector such as a DVI connector. Alternatively, a plurality of rendering pipelines may be responsible for rendering a common portion of a visible frame buffer such as performed in a super-sample mode of compositing.

Image compositor 40 is responsible for assembling sub-screens from respective pipelines and recombining the multiple sub-screens into a single screen image for presentation on a monitor 35. The connection between compositor 40 and monitor 35 may be had via a standard analog monitor cable or digital flat panel cable. Image compositor 40 may be operable to assemble sub-screens in one of various modes. For example, compositor 40 may assemble sub-screens provided by rendering pipelines where each sub-screen is a rendering of a distinct portion of a composite image. In this manner, compositor 40 merges different portions of a rendered image, respectively provided by each pipeline, into a single, composite image prior to display of the final image. Compositor 40 may also operate in an accumulate mode in which all pipelines provide renderings of a complete screen. In the accumulate mode, compositor 40 sums the pixel output from each rendering pipeline and averages the result prior to display. Other modes of operation are possible. For example, a screen may be partitioned and have multiple pipelines, such as rendering pipelines, assigned to a particular partition, while other pipelines are assigned to one or more remaining partitions in a mixed mode of operation. Thereafter sub-screens provided by rendering pipelines assigned to a common partition are averaged as in the accumulate mode.

Master pipeline 32A receives graphical data from application 22 run by master system 20. Master pipeline 32A preferably renders two-dimensional (2D) graphical data to frame buffer 33A and routes three-dimensional graphical data to slave pipelines 32B–32N, which render the 3D-graphical data to frame buffers 33B–33N.

Each frame buffer 33A–33N outputs a stream of graphical data to compositor 40. Compositor 40 is configured to combine or composite each of the data streams from frame buffers 33A–33N into a single data stream that is provided to a monitor 35, such as a cathode ray tube or other device for displaying an image. The graphical data provided to monitor 35 by compositor 40 defines the image to be displayed by monitor 35 and is based on the graphical data received from frame buffers 33A–33N.

Preferably, master system 20 and each of pipelines 32A–32N are respectively implemented via stand-alone computer systems, or workstations. However, it is possible to implement master system 20 and pipelines 32A–32N in other configurations. For example, master system 20 and master pipeline 32A may be implemented via a single computer workstation. A computer used to implement master system 20 and/or one or more pipelines 32A–32N may be utilized to perform other desired functionality when the workstation is not being used to render graphical data. As mentioned hereinabove, master system 20 and pipelines 32A–32N may be interconnected via a local area network 25 although other types of interconnection circuitry may be utilized without departing from the principles of the present invention.

In an embodiment of the present invention, application 22 may comprise a non-stereo graphics application. Pipelines responsible for rendering 3D portions of an image to be assembled by compositor 40 may comprise a translation application that receives image data from graphics application 20 and performs a transform thereon that results in a translation of non-stereo image data to stereo image data viewable with stereo image viewing equipment as described more fully hereinbelow.

Master pipeline 32A receives graphical data from application 22 run by master system 20. Master pipeline 32A preferably renders two-dimensional graphical data to frame buffer 33A and routes three-dimensional graphical data to slave pipelines 32B–32N which render the 3D-graphical data to respective frame buffers 33B–33N.

Each frame buffer 33A–33N outputs a stream of graphical data to compositor 40. Compositor 40 is configured to combine or composite each of the data streams from frame buffers 33A–33N into a single data stream that is provided to a monitor 35, such as a cathode ray tube or other device for displaying an image. The graphical data provided to monitor 35 by compositor 40 defines the image to be displayed by monitor 35 and is based on the graphical data received from frame buffers 33A–33N. The graphical data provided by master system 20 may include viewable data, such as RGB data, that may be displayed on display device 35 and other non-viewable data, such as depth (Z) data, that may be used to facilitate processing of viewable data by a node of system 10.

Preferably, master system 20 and each of pipelines 32A–32N are respectively implemented via stand-alone computer systems, or workstations. However, it is possible to implement master system 20 and pipelines 32A–32N in other configurations. For example, master system 20 and master pipeline 32A may be implemented via a single computer workstation. A computer used to implement master system 20 and/or one or more pipelines 32A–32N may be utilized to perform other desired functionality when the workstation is not being used to render graphical data. As mentioned hereinabove, master system 20 and pipelines 32A–32N may be interconnected via a local area network 25 although other types of interconnection circuitry may be utilized without departing from the principles of the present invention.

Figure 3:
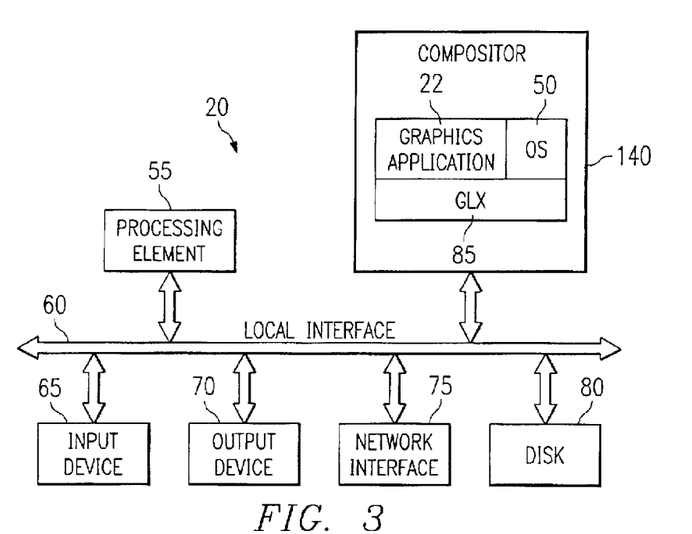
FIG. 3 is a block diagram of a master system of a visualization system that may feature graphic pipelines of the present invention.

In FIG. 3, there is a block diagram of master system 20 of a visualization system that may feature graphic pipelines of the present invention. Master system 20 stores graphics application 22, such as a non-stereo imaging application, in a memory unit 40. Through conventional techniques, application 22 is executed by an operating system 50 and one or more conventional processing elements 55 such as a central processing unit. Operating system 50 performs functionality similar to conventional operating systems, controls the resources of master system 20, and interfaces the instructions of application 22 with processing element 55 as necessary to enable application 22 to run properly.

Processing element 55 communicates to and drives the other elements within master system 20 via a local interface 60, which may comprise one or more buses. Furthermore, an input device 65, for example a keyboard or a mouse, can be used to input data from a user of master system 20, and an output device 70, for example a display device or a printer, can be used to output data to the user. A disk storage device 80 can be connected to local interface 60 to transfer data to and from a nonvolatile disk, for example a magnetic disk, optical disk, or another device. Master system 20 is preferably connected to a network interface 75 that facilitates exchanges of data with network 25.

In an embodiment of the invention, X protocol is generally utilized to render 2D-graphical data, and OpenGL protocol (OGL) is generally utilized to render 3D-graphical data, although other types of protocols may be utilized in other embodiments. By way of background, OpenGL protocol is a standard application programmer's interface to hardware that accelerates 3D-graphics operations. Although OpenGL protocol is designed to be window system independent, it is often used with window systems, such as the X Window System, for example. In order that OpenGL protocol may be used in an X Window System environment, an extension of the X Window System is used and is referred to herein as GLX.

Figure 4:
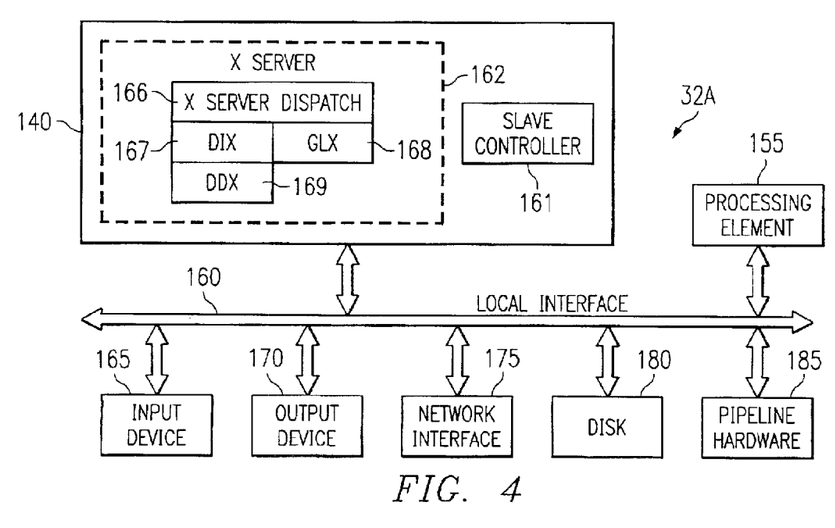
FIG. 4 is a block diagram of master pipeline that may be implemented in a visualization system of the present invention.

When application 22 issues a graphical command, a client-side GLX layer 85 of master system 20 transmits the command over network 25 to master pipeline 32A. With reference now to FIG. 4, there is a block diagram of master pipeline 32A that may be implemented in a visualization system of the present invention. Similar to master system 20, master pipeline 32A includes one or more processing elements 155 that communicate to and drive the other elements within master pipeline 32A via a local interface 160, which may comprise one or more buses. Furthermore, an input device 165, for example a keyboard or a mouse, can be used to input data from a user of pipeline 32A, and an output device 170, for example a display device or a printer, can be used to output data to the user. A disk storage device 180, such as a nonvolatile magnetic, optic or other data storage device, can be connected to local interface 160 to transfer data therebetween.

Master pipeline 32A may also include an X server 162 that may be implemented in software, hardware, or a combination thereof, and in an embodiment illustrated in FIG. 4, X server 162 is implemented in software and stored in memory 140. Master pipeline 32A includes one or more processing elements 155 that communicate to and drive the other elements within master pipeline 32A via a local interface 160, which may comprise one or more buses. Furthermore, an input device 165, for example, a keyboard or a mouse, can be used to input data from a user of the pipeline 32A, and an output device 170, for example, a display device or a printer, can be used to output data to the user. A disk storage mechanism 180 may be connected to the local interface 160 to transfer data to and from a nonvolatile disk. Master pipeline 32A may be connected to a network interface 175 that allows an exchange of data with LAN 25. While master pipeline 32A and master system 20 are illustrated and described as separate entities of the compositing system, it should be understood that the functionalities of both may be implemented in a single device.

X server 162 may be implemented in software, hardware, or a combination thereof, and in the embodiment shown in FIG. 4, X server 162 is implemented in software and stored in memory 140. Preferably, X server 162 renders 2D X window commands, such as commands to create or move an X window. In this regard, an X server dispatch layer 166 is designed to route received commands to a device independent layer (DIX) 167 or to a GLX layer 168. An X window command that does not include 3D data is interfaced with DIX 167. An X window command that does include 3D data is routed to GLX layer 168(e.g. an X command having an embedded OGL protocol, such as a command to create or change the state of a 3D image within an X window.) A command interfaced with DIX 167 is executed thereby and potentially by a device dependent layer (DDX) 179, which drives graphical data associated with the executed command through pipeline hardware 185 to frame buffer 33A.

Figure 5:
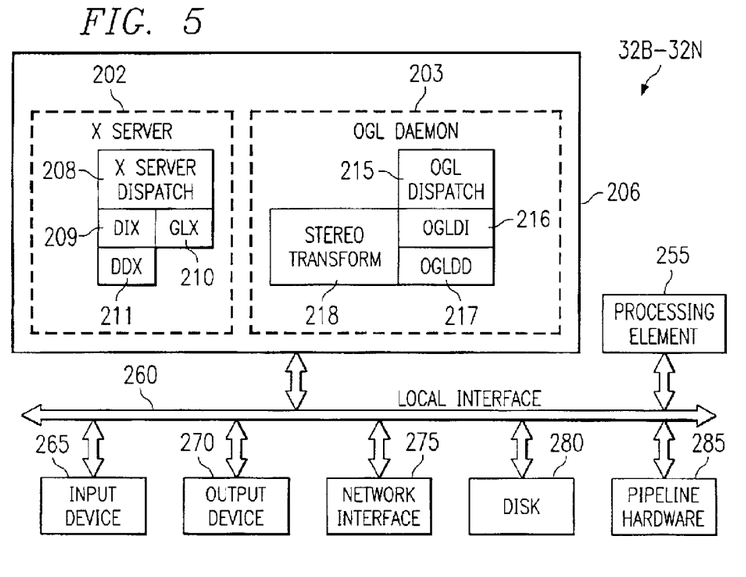
FIG. 5 is a block diagram of slave pipelines of the present invention.

Preferably, each of slave pipelines 33B–33N of the present invention is preferably configured according to the block diagram shown in FIG. 5, although other configurations of pipelines 32B–32N are possible. Each of slave pipelines 32B–32N includes an X server 202, similar to X server 162 discussed hereinabove, and an OGL daemon 203. X server 202 and OGL daemon 203 may be implemented in software, hardware, or a combination thereof, and in the embodiment shown in FIG. 5, X server 202 and OGL daemon 203 are implemented in software and stored in memory 206. Similar to graphics application 22 and master pipeline 32A, each of slave pipelines 32B–32N include one or more processing elements 255 that communicate to and drive other elements within pipeline 32B–32N via a local interface 260, which may comprise one or more buses. Furthermore, an input device 265, for example, a keyboard or a mouse, can be used to input data from a user of pipeline 32B–32N, and an output device 270, for example, a display device or a printer, can be used to output data to the user. A disk storage mechanism 280 can be connected to local interface 260 to transfer data to and from a nonvolatile disk. Each pipeline 32B–32N is preferably connected to a network interface 275 that enables pipeline 32B–32N to exchange data with network 25.

X server 202 comprises an X server dispatch layer 208, a GLX layer 210, a DIX layer 209, and a DDX layer 211. Preferably, each command received by slave pipelines 32B–32N includes 3D-graphical data and may include 2D-graphical data as well. X server dispatch layer 208 interfaces the 2D data of any received commands with DIX layer 209 and interfaces the 3D data of any received commands with GLX layer 210. DIX layer 209 and DDX layer 211 are configured to process or accelerate the 2D data and to drive the 2D data through pipeline hardware 285 to one of frame buffers 33B–33N.

GLX layer 210 interfaces the 3D data with OGL dispatch layer 215 of OGL daemon 203. OGL dispatch layer 215 interfaces this data with an OGL DI layer 216. OGL DI layer 216 and OGL DD layer 217 are configured to process the 3D data and to accelerate or drive the 3D data through pipeline hardware 285 to an associated frame buffer 33B–33N. Thus, the 2D-graphical data of a received command is processed or accelerated by X server 202, and the 3D-graphical data of the received command is processed or accelerated by OGL daemon 203. A stereo transform application 218 may interface with OGL DI and/or OGL DD layers and perform manipulation of non-stereo image data. Preferably, stereo transform application 218 is operable to receive data, such as an viewing matrix, defining a 3D image, or image portion, and perturb the data by a fixed amount such that multiple images are rendered from the image data. Output of stereo transform application 218 generated from each image input thereto is preferably a right and left image thereof required to generate a stereo image. A transform operation performed by stereo transform application 218 preferably comprises modifications to both viewable image data and non-viewable image data, such as Z data, of the non-stereo image data input thereto.

Preferably, slave pipelines 32B–32N are configured to render 3D images based on the graphical data from master pipeline 32A, according to one of three modes of operation: an optimization mode, a super-sampling mode, and a jitter mode. In the optimization mode, each of slave pipelines 32B–32N renders a different portion of a 3D image such that the overall process of rendering the 3D image is faster. In the super-sampling mode, each portion of a 3D image rendered by one or more of slave pipelines 32B–32N is super-sampled in order to increase quality of the 3D image via anti-aliasing. In the jitter mode, each of slave pipelines 32B–32N renders the same 3D image but slightly offsets each rendered 3D image with a different offset value. Compositor 140 then averages the pixel data of each pixel for the 3D images rendered by pipelines 32B–32N in order to produce a single 3D image of increased image quality. It should be understood that the described modes of operation are exemplary only and other operational modes are possible.

With reference again to FIG. 2, the operation and interaction of application 22, pipelines 32A–32N and compositor 140 will now be described in more detail according to an embodiment of the invention while system 10 operates in the optimization mode. Master pipeline 32A, in addition to controlling the operation of slave pipelines 32B–32N as described hereinafter, is used to create and manipulate an X window to be displayed by display device 35. Furthermore, each of slave pipelines 32B–32N is used to render 3D-graphical data within a portion of the X window.

Figure 6:
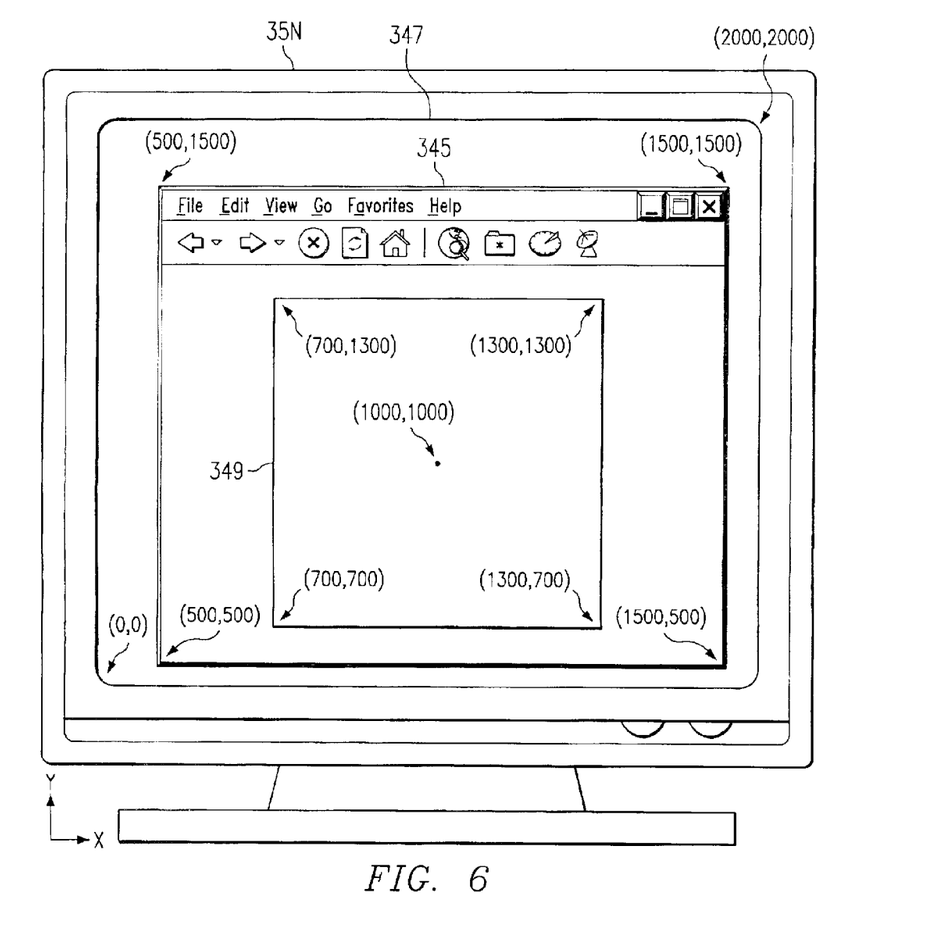
FIG. 6 is a front view of a display device displaying a window on a screen thereof according to an embodiment of the present invention.

For the purpose of illustrating the aforementioned embodiment, assume that the application 22 issues a function call, i.e. master system 20 executes a function call within application 22 via processing element 55, for creating an X window having a 3D image displayed within the X window. FIG. 6 is a front view of display device 35 displaying a window 345 on a screen 347 thereof according to an exemplary compositing technique. While the particular compositing techniques described hereinbelow may be implemented in an embodiment of the invention, it should be understood that the illustrated compositing techniques are exemplary only and numerous others may be substituted therefor. In the illustrative example shown by FIG. 6, screen 347 is 2000 pixels by 2000 pixels and X windows 345 is 1000 pixels by 1000 pixels. Window 345 is offset from each edge of screen 347 by 500 pixels. Assume 3D-graphical data is to be rendered in a center region 349 of X window 345. Center region 349 is offset from each edge of window 345 by 200 pixels.

In response to execution of the function call by master system 20, application 22 transmits to master pipeline 32A a command to render X window 345 and a command to render a non-stereo 3D image within portion 349 of X window 345. The command for rendering X window 345 should comprise 2D-graphical data defining X window 345, and the command for rendering the non-stereo 3D image within X window 345 should comprise 3D-graphical data defining a 3D image that may be transformed into a stereo image by stereo transform application 218 to be displayed within region 349. Preferably, master pipeline 32A renders 2D-graphical data from the former command via X server 162.

The graphical data rendered by any of pipelines 32A–32N comprises sets of values, such as values contained in an image matrix, that respectively define a plurality of pixels. Each set of values comprises at least a color value and a plurality of coordinate values associated with the pixel being defined by the set of values. The coordinate values define the pixel's position relative to the other pixels defined by the graphical data, and the color value indicates how the pixel should be colored. While the coordinate values indicate the pixel's position relative to the other pixels defined by the graphical data, the coordinate values produced by application 22 are not the same coordinate values assigned by display device 35 to each pixel of screen 347. Thus, pipelines 32A–32N should translate the coordinate values of each pixel rendered by pipelines 32A–32N to the coordinate values used by display device 35 to display images. Sometimes the coordinate values produced by application 22 are said to be "window-relative," and the aforementioned coordinate values translated from the window-relative coordinates are said to be 'screen-relative.' The concept of translating window-relative coordinates to screen-relative coordinates is well-known, and techniques for translating window-relative coordinates to screen-relative coordinates are employed by most conventional graphical display systems.

In addition to translating coordinates of 2D data rendered by master pipeline 32A from window-relative to screen-relative, master pipeline 32A in each mode of operation also assigns a particular color value, referred to hereafter as the "chroma-key" to each pixel within region 349. The chroma-key indicates which pixels within X window 345 may be assigned a color value of a 3D image that is generated by slave pipelines 32B–32N. In this regard, each pixel assigned the chroma-key as the color value by master pipeline 32A is within region 349 and, therefor, may be assigned a color of a 3D object rendered by slave pipelines 32B–32N. In the example shown by FIG. 6, the graphical data rendered by master pipeline 32B and associated with screen-relative coordinate values ranging from (700, 700) to (1300, 1300) are assigned the chroma-key as their color value by master pipeline 32A, since region 349 is the portion of X window 345 that is to be used for displaying 3D images.

As shown by FIG. 4, master pipeline 32B includes a slave controller 161 that is configured to provide inputs to each rendering node, for example slave pipelines 32B–32N, over network 25. Slave controller 161 may be implemented in software, hardware, or a combination thereof, and in the embodiment shown in FIG. 4, slave controller is implemented in software and stored in memory 140. The inputs from the slave controller 161 inform slave pipelines 32B–32N of which mode each slave pipeline 32B–32N should presently operate. In the present example, slave controller 161 transmits inputs to each slave pipeline 32B–32N that define a particular mode in which each slave pipeline 32B–32N should presently operate. In the present example, slave controller 161 transmits inputs to each slave pipeline 32B–32N directing operation in optimization mode thereby. Inputs from slave controller 161 also indicate which portion of region 349 is the responsibility of which rendering node, for example slave pipelines 32B–32N. For example, assume for illustrative purposes, that each slave pipeline 32B–32N is responsible for rendering the graphical data displayed in one of a respective portion 366 and 367, as shown in front view of display device 35 in FIG. 7 according to an embodiment of the present invention.

Figure 7:
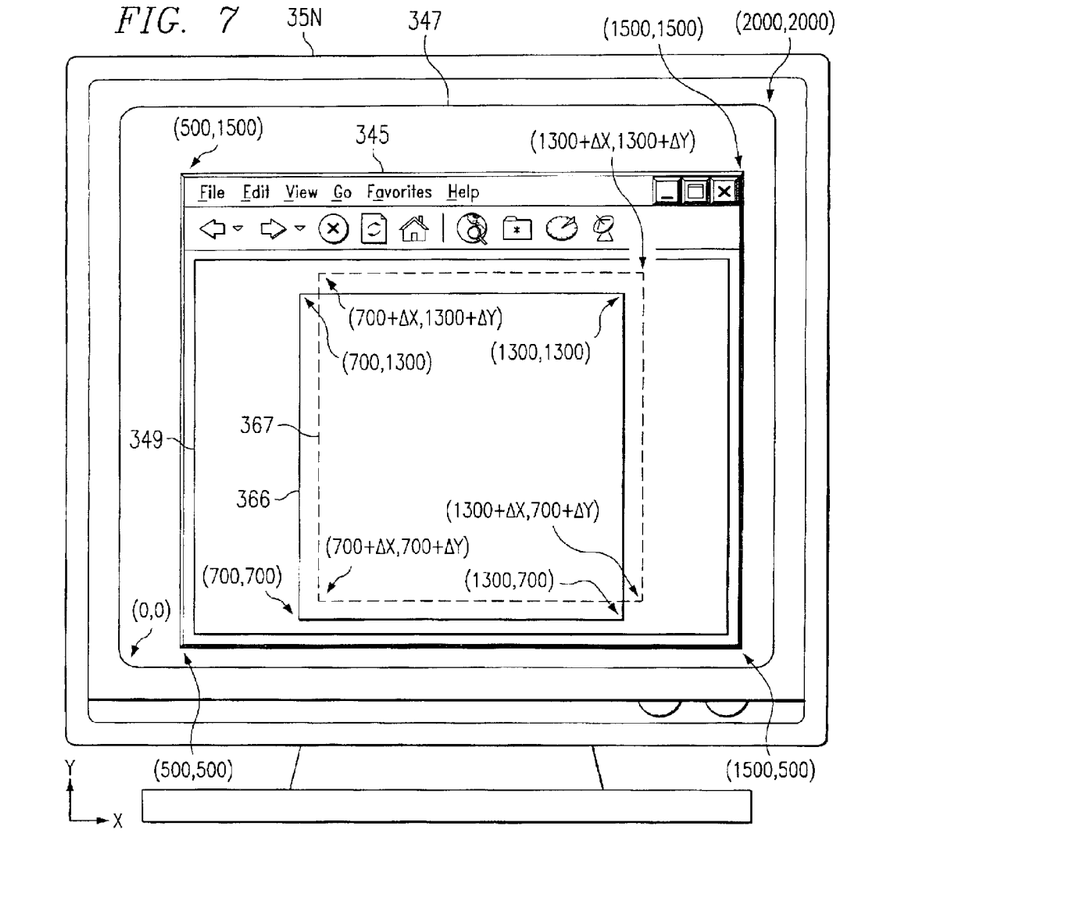
FIG. 7 is a front view of a display device having screen portions according to an embodiment of the present invention.

In this regard, assume that slave pipelines 32B–32N comprise two slave pipelines 32B and 32C. In the present example, each slave pipeline 32B–32C is responsible for a respective portion 366 and 367, that is slave pipeline 32B is responsible for rendering graphical data to be displayed in portion 366 (screen-relative coordinates (700, 700) to (1300, 1300)). Slave pipeline 32C is responsible for rendering graphical data to be displayed in portion 367 having screen-relative coordinates (700+$\Delta$X, 7000+$\Delta$Y) to (1300+$\Delta$X, 1300+$\Delta$Y)) offset from screen portion 366. In the illustrative example, screen portion 367 is offset from screen portion 366 by an x-axis offset of $\Delta$X and a y-axis offset of $\Delta$Y. The inputs transmitted by slave controller 161 to slave pipelines 32B–32C preferably indicate the range of screen coordinate values that each slave pipeline 32B–32C is responsible for rendering.

Note that the partition of region 349 can be divided among slave pipelines 32B–32E via other configurations, and it is not necessary for each pipeline 32B–32E to be responsible for an equally-sized area of region 349. Preferably, slave pipeline 32B is supplied image data generated by stereo transform application 218 that defines a left channel, or left image, of a composite stereo image and slave pipeline 32C is supplied image data generated by stereo application 218 that defines a right channel, or right image, of the composite stereo image.

Each slave pipeline 32B–32C is configured to receive from master pipeline 32A the graphical data of the command for rendering the 3D image to be displayed in region 349 and to render this data to frame buffers 33B–33C, respectively. In this regard, each pipeline 32B–32E renders graphical data defining a 2D X window that displays a 3D image within the window. More specifically, slave pipeline 32B renders graphical data to frame buffer 33B that defines an X window displaying a 3D image within portion 366. X server 202 maintained by slave pipeline 32B renders the data that defines the foregoing X window, and OGL daemon 203 maintained by slave pipeline 32B renders a left channel stereo image data that defines the 3D image displayed within X window 345. Slave pipeline 32C renders graphical data to frame buffer 33C that defines an X window displaying a 3D image within portion 367. X server 202 maintained by slave pipeline 32C renders the data that defines X window 345, and OGL daemon 203 maintained by slave pipeline 32C renders the right channel data that defines the right image of a stereo 3D image displayed within the foregoing X window.

Note that the graphical data rendered by each pipeline 32B–32C defines a portion of the overall image to be displayed within region 349. Thus, it is not necessary for each pipeline 32B–32C to render all of the graphical data defining the entire 3D image to be displayed in region 349. Preferably, each slave pipeline 32B–32C discards the graphical data that defines a portion of the image that is outside of the pipeline's responsibility. In this regard, each pipeline 32B–32C receives from master pipeline 32A the graphical data that defines the 3D image to be displayed in region 349. Each pipeline 32B–32C, based on the aforedescribed inputs received from slave controller 161, then determines which portion of this graphical data is within pipeline's responsibility and discards the graphical data outside of this portion prior to rendering to the associated buffer 33B–33C.

Bounding box techniques may be employed to enable each slave pipeline 32B–32C to quickly discard a large amount of graphical data outside of the respective pipeline's responsibility before significantly processing such graphical data. Accordingly, each set of graphical data transmitted to pipelines 32B–32C may be associated with a particular set of bounding box data. The bounding box data defines a graphical bounding box that contains at least each pixel included in the graphical data this is associated with the bounding box data. The bounding box data can be quickly processed and analyzed to determine whether a pipeline 32B–32C is responsible for rendering any of the pixels included within the bounding box. If a pipeline 32B–32C is responsible for rendering any of the pixels included within the bounding box, then that pipeline renders the received graphical data that is associated with the bounding box. If pipeline 32B–32C is not responsible for rendering any of the pixels included within the bounding box, then that pipeline discards the received graphical data that is associated with the bounding box and does not attempt to render the discarded graphical data. Thus, processing power is not wasted in rendering any graphical data that defines an object outside of a partition 366 and 367 assigned to a particular pipeline 32B–32C. After pipelines 32B–32C have respectively rendered graphical data to frame buffers 33B–33C, the graphical data is read out of frame buffers 32B–32C through conventional techniques and transmitted to compositor 140 and combined into a single data stream.

It should be noted that master pipeline 32A has been described herein as only rendering 2D-graphical data. However, it is possible for master pipeline 32A to be configured to render other types of data, such as 3D image data, as well. In this regard, master pipeline 32A may also include an OGL daemon, similar to OGL daemon 203 maintained by slave pipelines 32B–32C. The purpose for having master pipeline 32A only execute graphical commands that do not include 3D image data is to reduce the processing burden on master pipeline 32A because master pipeline 32A performs various functions not performed by slave pipelines 32B–32N. In this regard, executing graphical commands including only 2D image data is generally less burdensome than executing commands including 3D image data. However, it may be possible and desirable in some implementations to allow master pipeline 32A to share in the execution of graphical commands that include 3D image data. Furthermore, it may also be possible and desirable in some implementations to allow slave pipelines 32B–32C to share in the execution of graphical commands that do not include 3D image data.

Figure 8:
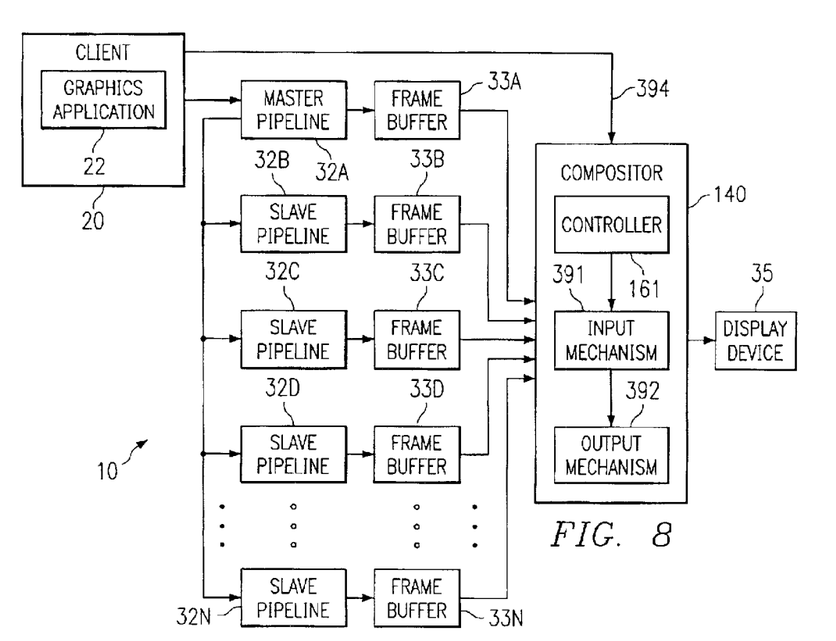
FIG. 8 is a block diagram of a visualization system according to an embodiment of the present invention.

As mentioned hereinabove, compositor 140 may be employed by a computer graphical display system and may be improved by an implementation of the present invention. In FIG. 8, there is a block diagram of system 10 having compositor 140 that may be implemented in a visualization system according to an embodiment of the present invention. In this regard, computer graphical display system 10 comprises a master system 20, master pipeline 32A, and one or more slave pipelines 32B–32N. Master pipeline 32A receives graphical data from an application 22 stored in master system 20. Master pipeline 32A preferably renders 2D-graphical data to frame buffer 33A and routes 3D-graphical data to slave pipelines 32B–32N which render the 3D-graphical data to frame buffers 33B–33N, respectively. Frame buffers 33A–33N each output a stream of graphical data to compositor 140, which is configured to composite or combine each of the data streams into a single, composite data stream. The composite data stream then may be provided to display device 35.

Compositor 140 may be implemented in hardware, software, firmware, or a combination thereof. Compositor 140, in general, comprises an input mechanism 391, an output mechanism 392, and a controller 393. As described in detail hereinafter, controller 393 enables input mechanisms 391 to appropriately combine or composite the data streams from the various pipelines so as to provide a composite data stream which is suitable for viewing. In order to facilitate control of input mechanism 391, compositor 140 may receive control information from master system 20, with such control information being provided to controller 392 via a transmission media 394, such as a universal serial bus, for example, or one of pipelines 32A–32N.

As embodiments of compositor 140, components thereof, and associated functionality may be implemented in hardware, software, firmware, or a combination thereof, those embodiments implemented at least partially in software can be adapted to run on different platforms and operating systems. In particular, logical functions implemented by compositor 140 may be provided as an ordered listing of executable instruction that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semiconductor system, apparatus, device, or propagation medium now known or later developed, including, but not by way of limitation, the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 10:
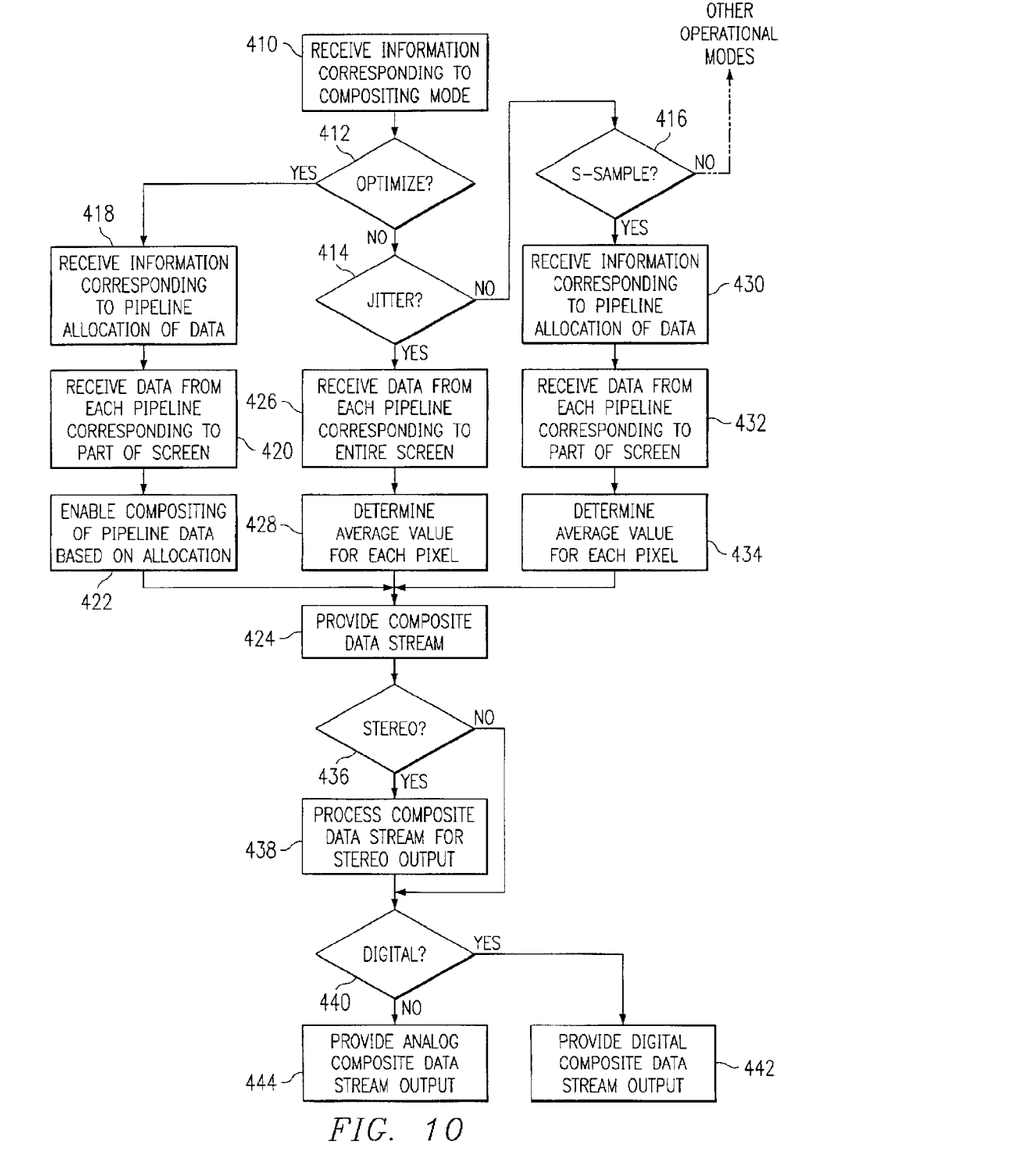
FIG. 10 shows a more detailed flowchart of a compositor functionality according to an embodiment of the present invention.

Reference will now be made to the flowcharts of FIGS. 10 and 11, which depict functionality of preferred embodiments of the compositor. In this regard, each block of the flowcharts represents one or more executable instructions for implementing the specified logical function or functions. It should be noted that in some alternative implementations, the functions noted in the various blocks may occur out of the order depicted in the respective figures depending upon the functionality involved. For example, two blocks shown in succession in FIG. 10 may, in fact, be executed substantially concurrently where the blocks may sometimes be executed in the reverse order depending upon the functionality involved.

Figure 9:
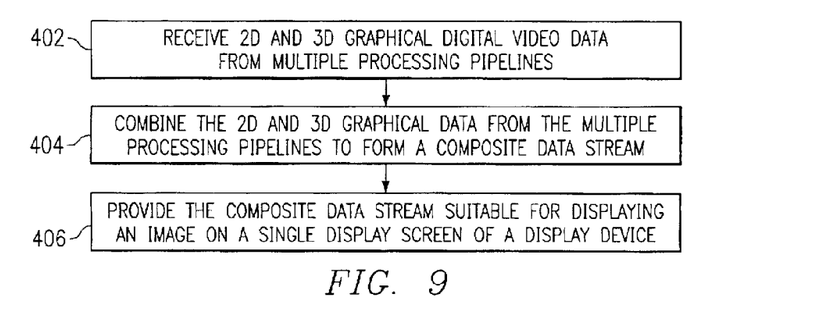
FIG. 9 is a flowchart of the functionality of the compositor that may be implemented within a visualization system according to an embodiment of the present invention.

Referring now to FIG. 9, there is a simplified flowchart of the functionality of an embodiment of the compositor that may be implemented within a visualization system according to an embodiment of the present invention. Functionality of the compositor may be construed as beginning at block 402, where 2D- and 3D-graphical data relating to an image to be rendered, such as graphical data provided from multiple processing pipelines, are received. In block 404, the graphical data are combined to form a composite data stream containing data corresponding to the image. Thereafter, the compositor provides the composite data stream (block 406) to a display device for displaying the image.

In regard to the functionality or process depicted in FIG. 8, that process may be construed as beginning at block 410 where information corresponding to a particular compositing mode or format is received. Thereafter, such as depicted in blocks 412, 414 and 416, determinations are made as to whether the compositing mode information corresponds to one of an optimization mode (block 412), a jitter mode (block 414), or a super-sample mode (block 416).

If it is determined that the information corresponds to the optimization mode, the process may proceed to block 418 where information corresponding to the allocation of pipeline data is received. In this mode, each graphical processing pipeline is responsible for processing information relating only to a portion of the entire screen resolution being processed. Therefore, the information corresponding to the allocation of pipeline data relates to which portion of the screen corresponds to which pipeline. Proceeding to block 420, data is received from each pipeline with the data from each pipeline corresponding to a particular screen portion. It should be noted that the pipeline that processes the 2D-graphical information may process such 2D-graphical data for the entire screen resolution. Thus, the description of blocks 418 and 420 relate most accurately to the processing of 3D-graphical data. Thereafter, such as in block 422, compositing of pipeline data with regard to the aforementioned allocation of data is enabled. In block 424, a composite data stream, e.g., a data stream containing pixel data corresponding to the entire screen resolution (2000 pixels by 2000 pixels, for example) is provided.

If it is determined in block 414 that the information received in block 410 corresponds to the jitter or accumulate mode, the process proceeds to block 426 where pixel data from each pipeline corresponding to the entire screen resolution, e.g., 2000 pixels by 2000 pixels, is received. Thereafter, such as in block 428, an average value for each pixel may be determined utilizing the pixel data from each of the pipelines. After block 428, the process may proceed to block 424, as described hereinabove.

If it is determined in block 416 that the information received in block 410 corresponds to the super-sample mode, the process may proceed to block 430. As depicted therein, information corresponding to the allocation of pipeline data is received. For instance, the 3D-graphical data may be equally divided among the pipelines designated for processing 3D data. Continuing with this representative example, each of the pipelines also may be allocated a screen portion corresponding to 1000 pixels by 1000 pixels. Thereafter, such as depicted in block 432, data is received from each pipeline that corresponds to the aforementioned screen portion allocation. However, the data of each pipeline has been super-sampled during processing so that the received data from each pipeline corresponds to a screen size that is larger than its screen portion allocation. For example, data from each pipeline may correspond to a screen resolution of 2000 pixels by 2000 pixels, e.g., each of the horizontal and vertical dimensions may be doubled. Thus, each pipeline provides four pixels of data for each pixel to be rendered. In other configurations, each of the pipelines may provide various other numbers of pixels of data for each pixel to be rendered.

Proceeding to block 434, the super-sampled data is then utilized to determine an average value for each pixel to be rendered by each pipeline. More specifically, since each pixel to be rendered was previously super-sampled into four pixels, determining an average value for each pixel preferably includes down-sampling each grouping of four pixels back into one pixel. Thus, in the aforementioned example, data from each pipeline is down-sampled and the data from each pipeline, which is representative of a portion of the entire screen resolution, is then composited in block 424, as describe hereinabove.

After the composite data stream has been provided, such as depicted in block 424, a determination may then be made as to whether stereo output is desired (block 436). If it is determined that stereo processing is desired, the process may proceed block 438 where stereo processing is facilitated. If it was determined in block 436 that stereo processing was not desired or, alternatively, after facilitating stereo processing in block 438, the process proceeds to block 440. As depicted in block 440, a determination may be made as to whether a digital video output is desired. If a digital video output is desired, the process may proceed to block 442 for appropriate processing. Alternatively, if an analog output is desired, the process may proceed to block 444 where the composite data stream may be converted to an analog data stream.

Figure 11:
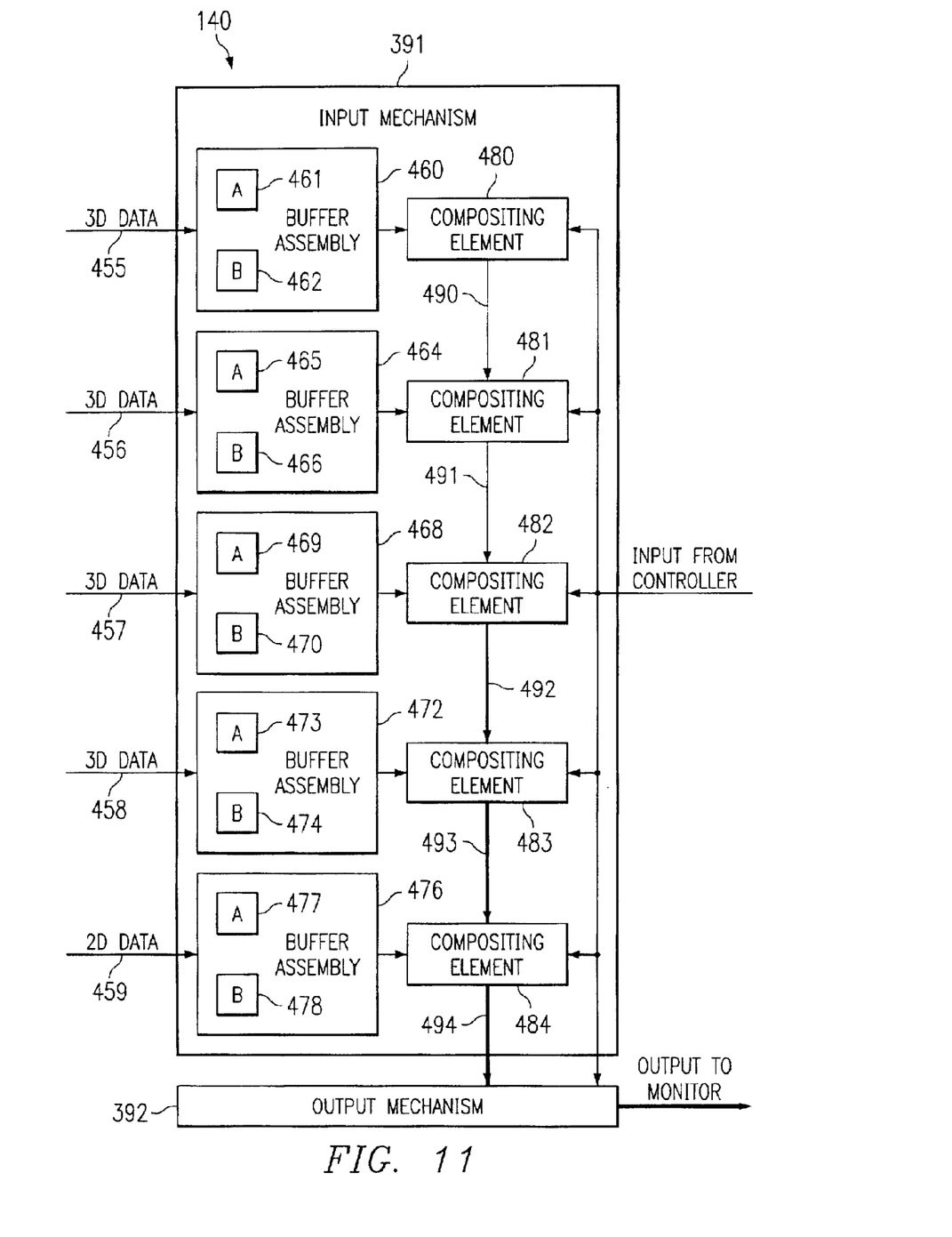
FIG. 11 is a block diagram of a compositor according to an embodiment of the present invention.

Referring now to FIG. 11, which depicts an input mechanism 391 and output mechanism 392, input 391 mechanism is configured to receive multiple data streams, e.g., data streams 455–459. In particular, the data streams are provided by pipelines, such as pipelines 32A–32N of FIG. 10 that shows a more detailed flowchart of a compositor functionality according to an embodiment of the present invention, with the data being intermediately provided to corresponding frame buffers, such as buffers 33A–33N. Each of the data streams 455–459 is provided to a buffer assembly of the input mechanism 391 that preferably includes two or more buffers, such as frame buffers or line buffers, for example. More specifically, data stream 455 is provided to buffer assembly 460, which includes buffers 461 and 462, data stream 456 is provided to buffer assembly 464, which includes buffers 465 and 466, data stream 457 is provided to buffer assembly 468, which includes buffers 469 and 470, data stream 458 is provided to buffer assembly 472, which includes buffers 473 and 474, and data stream 459 is provided to buffer assembly 476, which includes buffers 477 and 478. Although data stream 459 is depicted as comprising 2D data, data that may be provided by master pipeline 32A, for example, the 2D data, may be provided to any of the frame buffer assemblies. Preferably, 3D data provided to buffer assemblies 460, 464, 468, and 472 by respective pipelines 32A–32N sequentially alternates between a right channel image rendering and a left channel image rendering. More particularly, each buffer of the buffer pairs of assemblies 460, 464, 468, and 472 may respectively receive a left or right channel image rendering. For example, buffers 461, 465, 469 and 473 may receive a right channel image rendering from a respective pipeline 32A–32N while buffers 462, 466, 470 and 474 may receive a left channel image rendering from a respective pipeline 32A–32N. Thus, each of 3D data streams 455–458 may be provided over a respective pair of input mediums. To facilitate sequentially alternating left and right channel 3D data inputs to input mechanism 391, each pipeline 32A–32N may be provided with two output devices, such as two graphics cards, that respectively output either a left or right channel image rendering to input mechanism 391 of compositor 140. The buffers of each buffer assembly cooperate so that a continuous output stream of data may be provided from each of the buffer assemblies. More specifically, while data from a particular data stream is being written to one of the pair of buffers of a buffer assembly, for example a right channel image rendering, data is being read from the other of the pair, for example a left channel image rendering. In other embodiments, buffer assemblies may be provided with more than two buffers that are adapted to provide a suitable output stream of data. Additionally, in still other embodiments, the pipelines may provide pixel data directly to respective compositing elements without intervening buffers being provided therebetween.

Each of the frame buffer assemblies communicates with a compositing element. For example, buffer assembly 460 communicates with compositing element 480, buffer assembly 464 communicates with compositing element 481, buffer assembly 468 communicates with compositing element 482, buffer assembly 472 communicates with compositing element 483, and buffer assembly 476 communicates with compositing element 484. So configured, each buffer assembly is able to provide its respective compositing element with an output data stream.

Each compositing element communicates with an additional compositing element for forming the composite data stream. More specifically, compositing element 480 communicates with compositing element 481, compositing element 481 communicates with compositing element 482, compositing element 482 communicates with compositing element 483, and compositing element 483 communicates with compositing element 484. So configured, data contained in data stream 455 is presented to compositing element 480 via buffer assembly 460. In response thereto, compositing element 480 outputs data in the form of data stream 490, which is provided as an input to compositing element 481. Compositing element 481 also receives an input corresponding to data contained in data stream 456 via buffer assembly 464. Compositing element 481 then combines or composites the data provided from buffer assembly 464 and compositing element 480 and outputs a data stream 491. Thus, data stream 491 includes data corresponding to data streams 455 and 456. Compositing element 482 receives data stream 491 as well as data contained within data stream 457, which is provided to compositing element 482 via buffer assembly 468. Compositing element 482 composites the data from data stream 491 and data stream 457, and then outputs the combined data via data stream 492. Compositing element 483 receives data contained in data stream 492 as well as data contained within data stream 458, which is provided to compositing element 483 via frame buffer 472. Compositing element 483 composites the data from data stream 492 and data stream 458, and provides an output in the form of data stream 493. Data stream 493 is provided as an input to compositing element 484. Additionally, compositing element 484 receives data corresponding to data stream 459, which is provided via buffer assembly 476. Compositing element 484 then composites the data from data stream 493 and data stream 459, and provides a combined data stream output as composite data stream 494. Composite data stream 494 then is provided to output mechanism 392.

Compositing of the multiple data streams preferably is facilitated by designating portions of a data stream to correspond with particular pixel data provided by the aforementioned pipelines. In this regard, compositing element 480, which is the first compositing element to provide a compositing data stream, is configured to generate a complete frame of pixel data, i.e., pixel data corresponding to the entire resolution to be rendered. This complete frame of pixel data is provided by compositing element 480 as a compositing data stream. In response to receiving the compositing data stream, each subsequent compositing element may then add pixel data, i.e., pixel data corresponding to its respective pipeline, to the compositing data stream. After each compositing element has added pixel data to the compositing data stream, the data stream then contains pixel data corresponding to data from all of the aforementioned pipelines. Such a data stream, i.e., a data stream containing pixel data corresponding to data from all of the processing pipelines, may be referred to herein as a combined or composite data stream.

The first compositing element to provide pixel data to a compositing data stream, e.g., compositing element 480, also may provide video timing generator (VTG) functionality. Such VTG functionality may include, for example, establishing horizontal scan frequency, establishing vertical scan frequency, and establishing dot clock, among others.

Generation of a composite data stream will now be described with reference to FIGS. 8 and 12. As mentioned briefly hereinabove in regard to FIG. 7, a particular slave pipeline is responsible for rendering graphical data displayed in each of screen portions 366 and 367. Additionally, 2D-graphical information corresponding to the entire screen resolution, e.g., screen 347, is processed by a separate pipeline. For the purpose of the following discussion, graphical data associated with screen portion 366 corresponds to data stream 455 of the block diagram of compositor 140 according to an embodiment of the present invention as illustrated in FIG. 11, with screen portion 367 corresponding to data stream 456. Additional data streams, such as data streams 457 and 458 may be assigned to one of screen portions 366 and 367 in the event more than two slave pipelines are employed by system 10. Additionally, 2D-graphical data, which is represented by window 345 of FIG. 7, corresponds to data stream 459 of FIG. 11.

As described hereinabove, data streams 455 and 456 are provided to their respective buffer assemblies where data is written to one of the buffers of each of the respective buffer assemblies as data is read from the other buffer of each of the assemblies. The data then is provided to respective compositing elements for processing. More specifically, receipt of data by compositing element 480 initiates generation of an entire frame of data by that compositing element. Thus, in regard to the representative example depicted in FIG. 7, compositing element 480 generates a data frame of 2000 pixels by 2000 pixels, e.g., data corresponding to the entire screen resolution 347 of FIG. 7. Compositing element 480 also is programmed to recognize that data provided to it corresponds to pixel data associated with a particular screen portion, e.g., screen portion 366. Therefore, when constructing the frame of data corresponding to the entire screen resolution, compositing element 480 utilizes the data provided to it, such as via its buffer assembly, and appropriately inserts that data into the frame of data. Thus, compositing element 480 inserts pixel data corresponding to screen portion 366, i.e., pixels (700, 700) to (1300, 1300), into the frame. Those pixels not corresponding to screen portion 366 may be represented by various other pixel information, as desired. For instance, in some embodiments, the data corresponding to remaining portions of the frame may be left as zeros, for example. Thereafter, the generated frame of data, which now includes pixel data corresponding to screen portion 366, may be provided from compositing element 480 as compositing data stream 490. Compositing data stream 490 then is provided to a next compositing element for further processing.

As depicted in FIG. 11, compositing data stream 490 is received by compositing element 481. Compositing element 481 also is configured to receive data from data stream 456, such as via buffer assembly 464, that may contain data corresponding to screen portion 367 of FIG. 7, for example. Thus, compositing element 481 may receive data corresponding to pixels (700+ΔX, 700+ΔY) to (1300+ΔX, 1300+ΔY). Compositing element 481 is configured to insert the pixel data corresponding to pixels of screen portion 367 into the compositing data stream by replacing any data of the stream previously associated with, in this case, pixels (700+ΔX, 700+ΔY) to (1300+ΔX, 1300+ΔY), with data contained in data stream 456. Thereafter, compositing element 481 is able to provide a compositing data stream 491, which contains pixel data corresponding to the entire screen resolution as well as processed pixel data corresponding to screen portions 366 and 367.

Compositing data stream 491 may be provided to another compositing element, e.g., compositing element 482 if system 10 comprises more than two slave pipelines. Additional data streams 458 and 459 may be composited with data stream 491 to provide, for example, greater resolution to a final composite image.

Compositing data stream 491 is provided to compositing element 484 (possibly via intermediate composite elements) which is adapted to receive 2D processed graphical data, such as via data stream 459 and its associated buffer assembly 476. Data stream 459, in addition to containing the 2D data, also includes a chroma-key value corresponding to pixels that are to be replaced by processed pixel data, e.g., 3D pixel data contained in compositing data stream 491. For example, the chroma-key value may be assigned a predetermined color value, such as a color value that typically is not often utilized during rendering. So provided, when pixel data corresponding to data stream 459 and pixel data from compositing stream 491 are received by compositing element 484, 2D pixel data is able to overwrite the pixel data contained within compositing data stream 491, except where the data corresponding to data stream 459 is associated with a chroma-key value. At those instances where a chroma-key value is associated with a particular pixel, the processed data from the compositing data stream remains as the value for that pixel, i.e., the processed data is not overwritten by the chroma-key value. Expressed in an alternative manner, pixel data from compositing data stream 491 is able to overwrite the pixel data corresponding to data stream 459 only where the pixel data corresponding to data stream 459 corresponds to the chroma-key value. So configured, compositing element 484 is able to provide a composite data stream 494 which includes pixel data corresponding to each of the processing pipelines.

As mentioned hereinabove, the compositor may facilitate compositing of the various data streams of the processing pipelines in a variety of formats, such as super-sample, optimization, and jitter. In order to facilitate such compositing, each compositing element is configured to receive a control signal from controller 161. In response to the control signal, each compositing element is adapted to combine its respective pixel data input(s) in accordance with the compositing format signaled by controller 161. Thus, each compositing element is re-configurable as to a mode of operation. Regardless of the particular compositing format utilized, however, such compositing preferably is facilitated by serially, iteratively compositing each of the input data streams so as to produce the composite data stream.

In a preferred embodiment of the compositor, the various functionality depicted in the block diagram of FIG. 11 may be implemented by cards which are adapted to interface with a back-plane of compositor 140. More specifically, compositing elements 480 and 481 may be provided on a first input card. Additional compositing elements, such as compositing elements 482 and 483, may be provided on a second input card, and compositing element 484 may be provided on a third input card. An output card and a controller card also may be provided. Additionally, it should be noted that each of the cards may be interconnected in a "daisy-chain" configuration, whereby each card communicates directly with adjacent cards along the back-plane, although various other configurations may be utilized. However, the "daisy-chain" configuration conveniently facilitates the serial, iterative compositing techniques employed by preferred embodiments of the present invention.

The foregoing discussion of the compositor has focused primarily on the compositing of multiple digital video data streams to produce a single, composite data stream. The following is a description of preferred methods for outputting such a composite data stream. More specifically, the output mechanism, e.g., output mechanism 392 of FIG. 11, will now be described in greater detail.

As depicted in FIG. 11, output mechanism 392 is configured to receive composite data stream 494 and provide an output composite data stream for enabling display of an image on a display device. The output composite data stream may be provided in various formats from output mechanism 392 with a particular one of the formats being selectable based upon a control input provided from the controller. For instance, the composite data stream may be provided as the output composite data stream, i.e., the data of the composite data stream is not buffered within the output mechanism. However, the composite data stream may be buffered, such as when stereo output is desired. Buffering of the data of the composite data stream also provides the potential benefit of compensating for horizontal and/or vertical blanking which occurs during the rasterization process as the pixel illumination mechanism of an analog display device transits across the screen between rendering of frames of data. Additionally, the output composite data stream may be converted to analog data, such as by providing the composite data stream to a digital-to-analog converter of the output mechanism.

"Passive stereo" refers to the presentation of simultaneous channels, i.e., one channel being associated with the left eye of a viewer (the "left channel") and the other channel being associated with the right eye of the viewer (the "right channel"), of video display. Typically, passive stereo is facilitated by the use of headgear that is configured to allow each eye of the viewer to view only one of the simultaneously displayed channels of video. For example, a headgear may comprise a first and second lens filter and that filters light of specific frequencies. Accordingly, a composite stereo image assembled from two or more stereo image portions may be viewed in stereo.

Figure 12:
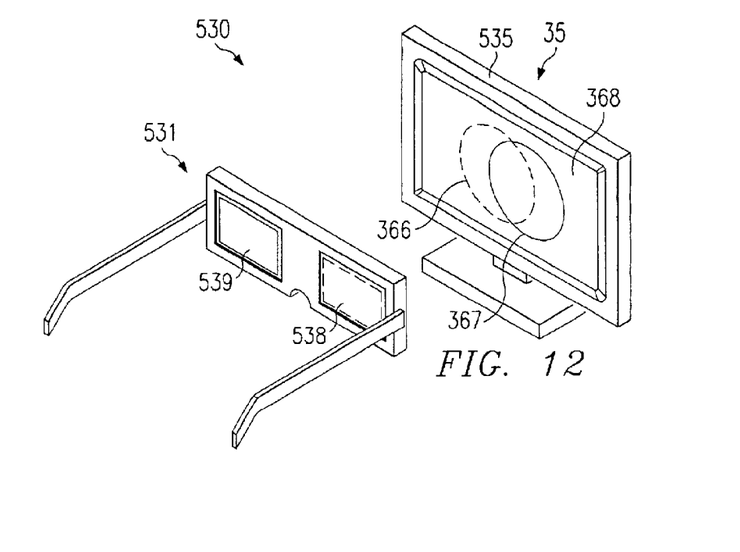
FIG. 12 is a representative perspective view of an exemplary passive stereo implementation that may be implemented in an embodiment of the present invention.

Referring now to FIG. 12, a representative perspective view of an exemplary passive stereo implementation 530 will be described in greater detail. A headgear 531 and a display device 35 typically are provided. Display device 35 for implementing passive stereo may be a conventional computer monitor or may employ two video projection devices each configured to receive one channel of video data and provide a corresponding video image to a screen thereof. In the present example, display device 35 is a conventional computer monitor operable to receive a composite image 368 comprised of a left stereo image portion 366 and a right stereo image portion 368.

Headgear 531 is configured to allow a viewer to simultaneously view the images provided on the display device, with only image 366 being viewable through eyepiece 538, and only image 367 being viewable through eyepiece 539. Enabling a viewer to view the images in the aforementioned manner may be accomplished with various configurations of headgear as is known in the art, with all such configurations being considered well within the scope of the present invention. A characteristic of depth of the image is perceived by the viewer due to simultaneous viewing of the left and right channel images, as is understood in the art.

Figure 13:
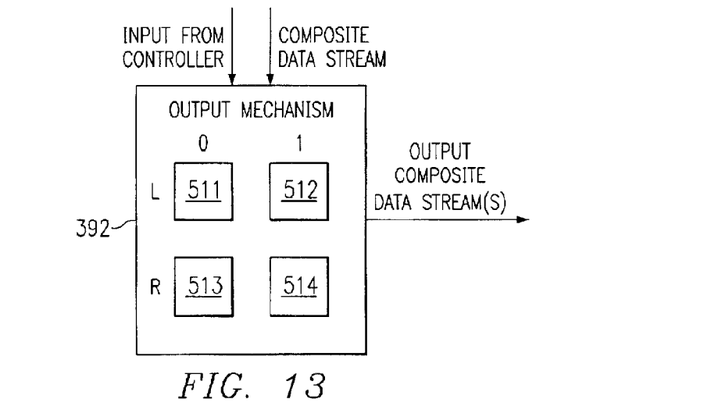
FIG. 13 is a block diagram of an output mechanism of a compositor that may be implemented in a visualization system according to an embodiment of the present invention.
Figure 14:
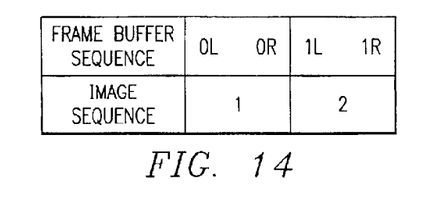
FIG. 14 is a data sequence to be contained in the output composite data streams of the output mechanism of FIG. 13.

As mentioned briefly hereinabove, preferred embodiments of the compositor may provide output composite data streams that are appropriately suited for passive stereo utilization. Referring to FIGS. 14 and 15, a block diagram of an output mechanism of a compositor and a data sequence to be contained in the output composite data streams of the output mechanism is shown. Output mechanism 392 preferably includes multiple frame buffers, with several of the buffers, i.e., buffers 511 and 512, being associated with a left channel, and several other of the buffers, i.e., buffers 513 and 514, being associated with a right channel. Additionally, while one buffer of a channel is receiving data from the composite data stream, the other buffer of the channel is providing viewable data to an output composite data stream.

As depicted in FIG. 14, the frame buffer configuration presented in FIG. 13 enables the following representative data sequence to be contained in the output composite data streams of the output mechanism, such as when an appropriate control input, i.e., an input calling for a passive stereo output, is received from controller 161. Additionally, data provided from the various pipelines may include overscanned data, e.g., an extra line(s) of data not to be rendered, that may contain instructions for compositing the pixel data provided by the pipelines.

Assuming that data from a frame buffer is provided to an output composite data stream when that frame buffer has received a complete set of pixel data, frame buffer 511 may provide its data to a first or left channel output composite data stream, while frame buffer 513 provides its data to a second or right channel output composite data stream. Thereafter, frame buffers 512 and 514 may provide their data to the first and second output composite data streams, respectively, as depicted. As is known, simultaneously providing corresponding left and right channel data should be maintained as the images provided by the channels typically only are slightly offset with respect to each other. However, the images provided by the two buffers, e.g., buffer 0, which includes frame buffers 511 and 513, and buffer 1, which includes frame buffers 512 and 514, may be entirely different, i.e., they may depict different scenes, as opposed to merely offset images. Therefore, if a particular frame buffer is not ready to provide viewable data to its respective output composite data stream when the frame buffer sequence would normally call for such data, the data previously provided as viewable data from that channel may be provided once again to its output composite data stream. For instance, if frame buffer 512 is not ready to provide viewable data to the left channel output composite data stream, pixel data from the frame buffers of buffer 0, e.g., frame buffers 511 and 513, may be provided once again to their respective output composite data streams. Accordingly, integrity of the simultaneously provided left and right channel data sequence maybe maintained.

Thus, a visualization system providing stereo graphics relying on compositing applications for assembling of image portions is provided that does not require specialized stereo graphics applications having image partitioning capabilities according to the teachings herein. While the present invention has been described with exemplary embodiments featuring passive stereo graphics, it should be understood that the teachings of the invention may be similarly applied for generating active stereo graphics.

What is claimed is:

1. A method of assembling a composite image, comprising:
   generating three-dimensional data defining a non-stereo image;
   assigning a first screen portion to a first rendering node;
   assigning a second screen portion to a second rendering node;
   rendering, by the first rendering node, a left image portion from the three-dimensional data;
   rendering, by the second rendering node, a right image portion from the three-dimensional data; and
   assembling the left image portion and the right image portion into the composite image.

2. The method according to claim 1, wherein generating three-dimensional data defining a non-stereo image further comprises generating three-dimensional data comprising RGB data and depth data defining the non-stereo image.

3. The method according to claim 1, wherein assigning a second screen portion to a second rendering node further comprises assigning, at an offset from the first screen portion, the second screen portion to the second rendering node.

4. The method according to claim 3, wherein assigning the second screen portion at an offset from the first screen portion further comprises assigning the second screen portion at an x-axis offset and a y-axis offset from the first screen portion.

5. The method according to claim 1, further comprising generating two-dimensional data defining a window in which the composite image is to be rendered.

6. A node of a network for rendering a three-dimensional image, comprising:
   a processing element; and
   a memory module maintaining a stereo transform application executable by the processing element, the stereo transform application operable to receive three-dimensional data defining a non-stereo image, process the three-dimensional data and provide output of at least one of a left channel image and a right channel image of a composite image comprised of the left channel image and the right channel image.

7. The node according to claim 6, further comprising pipeline hardware operable to transmit the output to a compositing node operable to assemble the output with an output from another node into a composite image.

8. The node according to claim 6, wherein the three-dimensional data defining the non-stereo image comprises RGB data and depth data associated therewith.

9. The node according to claim 6, wherein the memory module further maintains an application programmer's interface layer in communication with the stereo transform application, the three-dimensional data provided to the stereo transform application via the application programmer's interface.

10. The node according to claim 9, wherein the application programmer's interface comprises an instance of an OpenGL protocol layer.

11. The node according to claim 6, wherein the memory module further maintains an application that controls a bitmap display that receives and processes two-dimensional data associated with the three-dimensional data.

12. The node according to claim 11, wherein the application that controls a bitmap display is an instance of X server executable by the processing element.

13. A network for rendering a three-dimensional composite stereo image, comprising:
   a first and second rendering node each respectively comprising a first and second processing element and a first and second memory module maintaining a respective instance of a stereo transform application executable by the first and second processing element, each instance of the stereo transform application operable to receive data defining a three-dimensional non-stereo image, perform a transform on the three-dimensional non-stereo image and output at least one of a left channel image and a right channel image; and
   a compositor node operable to receive a respective first data stream and a second data stream from the first and second rendering nodes, the first data stream comprising one of the left channel image and the right channel image output from the instance of the stereo transform application maintained by the first rendering node, the second data stream comprising one of the left channel image and the right channel image output from the instance of the stereo transform application maintained by the second rendering node, the compositor node operable to assemble the first data stream and the second data stream into a composite three-dimensional stereo image.

14. The network according to claim 13, further comprising a master node running an instance of a non-stereo graphics application, the master node operable to provide the data defining the three-dimensional non-stereo image to each of the first and second rendering nodes.

15. The network according to claim 13, wherein the left channel image and the right channel image are assigned to respective portions of the composite image.

16. The network according to claim 15, wherein the left channel image and the right channel image are offset by an x-axis offset and a y-axis offset.

17. The network according to claim 13, further comprising a remote node, the compositor node operable to transmit the composite image to the remote node.

18. The method of claim 1, wherein said assembling comprises sequentially assembling the left image portion and the right image portion into the composite image.

19. A method of assembling a composite image, comprising:

generating three-dimensional data defining a non-stereo image;

assigning a first screen portion to a first graphics pipeline;

assigning a second screen portion to a second graphics pipeline;

rendering, by the first graphics pipeline, a left image portion from the three-dimensional data;

rendering, by the second graphics pipeline, a right image portion from the three-dimensional data; and assembling the left image portion and the tight image portion into the composite image.

20. The method according to claim 19, wherein generating three-dimensional data defining a non-stereo image further comprises generating three-dimensional data comprising RGB data and depth data defining the non-stereo image.

21. The method according to claim 19, wherein assigning a second screen portion to a second graphics pipeline further comprises assigning, at an offset from the first screen portion, the second screen portion to the second graphics pipeline.

22. The method according to claim 21, wherein assigning the second screen portion at an offset from the first screen portion further comprises assigning the second screen portion at an x-axis offset and a y-axis offset from the first screen portion.

23. The method according to claim 19, further comprising generating two-dimensional data defining a window in which the composite image is to be rendered.

* * * * *